United States Patent [19]

Brunschwig

[11] 3,986,252

[45] Oct. 19, 1976

[54] APPARATUS AND METHODS INVOLVED IN THE MANUFACTURE OF PRIME MOVERS

[75] Inventor: John M. Brunschwig, DeKalb, Ill.

[73] Assignee: General Electric Company, Fort Wayne, Ind.

[22] Filed: Apr. 8, 1975

[21] Appl. No.: 566,099

[52] U.S. Cl. .......................... 29/596; 29/205 R; 29/252; 29/282; 29/525; 310/42
[51] Int. Cl.² ........................................ H02K 15/14
[58] Field of Search ............. 29/205 R, 205 D, 252, 29/282, 596, 598, 525; 310/85, 88, 89, 42

[56] References Cited
UNITED STATES PATENTS

| | | | |
|---|---|---|---|
| 385,371 | 7/1888 | Paterson | 29/252 |
| 2,882,590 | 4/1959 | Dorenbos | 29/205 R |
| 3,037,268 | 6/1962 | Mitchell, Jr. et al. | 29/203 R |
| 3,136,042 | 6/1964 | Horn et al. | 29/203 R |
| 3,713,198 | 1/1973 | Tobak et al. | 29/252 |
| 3,786,561 | 1/1974 | Busian | 29/598 |
| 3,827,134 | 8/1974 | Wechsler | 29/252 |
| 3,855,489 | 12/1974 | Hershberger | 310/85 |

Primary Examiner—Carl E. Hall
Attorney, Agent, or Firm—Joseph E. Papin

[57] ABSTRACT

Apparatus for assembling a generally annular member in gripping engagement and generally coaxially about a selected position on a shaft. The apparatus has a pair of means conjointly and relatively movable axially with respect to the shaft and operable generally for guiding the member generally coaxially onto an end portion of the shaft and for driving the member therealong to its selected position. Means is movable in one of the guiding and driving means and mounted generally in universal movement relation to the other of the guiding and driving means for seating the member and for accommodating coaxial misalignment of the member in the event thereof upon its engagement with the shaft, and means is provided for resiliently resisting the universal movement of the seating and accommodating means to compensate for the coaxial misalignment of the member. Means on the one guiding and driving means is adapted for engaging a part associated with the shaft for housing it to arrest the conjoint movement of the guiding and driving means as the member is being driven along the shaft, and means is provided for predeterminately arresting the movement of the other guiding and driving means relative to the one guiding and driving means thereby to locate the member at its selected position on the shaft when the engaging means is engaged with the housing part.

Other apparatus, methods of assembling components, and methods of manufacturing prime movers, and methods of setting-up apparatus are also disclosed.

49 Claims, 13 Drawing Figures

APPARATUS AND METHODS INVOLVED IN THE MANUFACTURE OF PRIME MOVERS

BACKGROUND OF THE INVENTION

This invention relates generally to prime movers, such as a dynamoelectric machine for instance, and in particular to apparatus and methods involved in the manufacture thereof.

In the past, various apparatus and methods were utilized for manufacturing and assembling components onto rotatable assemblies of prime movers, such as the above-mentioned dynamoelectric machine. The rotatable assembly is, of course, rotatable about its axis of rotation in the dynamoelectric machine, and as well known in the art, a pair of spaced abutments, such as thrust washers or bearings, are provided on the rotatable assembly for engagement with associated parts of the dynamoelectric machine to predeterminately limit displacement movement of the rotatable assembly generally along its axis in the dynamoelectric machine. This predetermined limited axial movement of the rotatable assembly is commonly referred to as end play. In the manufacture of at least some dynamoelectric machines, it may be necessary, or at least desirable, to assemble various components onto the opposite end portions of the rotatable assembly and generally in gripping engagement therewith. For instance, U.S. Pat. No. 3,855,489 issued to Doran D. Hershberger on Dec. 17, 1974, illustrates a pair of lint shields which may be disposed in gripping engagement at selected positions about a pair of opposite end portions of a rotatable assembly subsequent to the assembly thereof in the dynamoelectric machine with the aforementioned end play. It is believed that if the opposite forces directed onto the opposite ends of the rotatable assembly during the assembly of the components in gripping engagement therewith are unbalanced, the rotatable assembly is shifted generally along its rotational axis thereby to move one of its thrust washer into engagement with the adjacent axial movement limiting abutment thereof on the dynamoelectric machine. In this manner, the differential between the unbalanced forces acting on the rotatable assembly would be taken on the thrust washer with the disadvantageous or undesirable result of bending or otherwise distorting it so as to deleteriously affect the subsequent operation of the dynamoelectric machine.

Again with reference to the aforementioned U.S. Pat. No. 3,855,489, it may be seen that it is also desirable to locate the lint shield in gripping engagement at a selected position on the end portion of a shaft and within an opening in an associated part of the dynamoelectric machine through which the shaft extends. Due to length tolerances in shafts as well as tolerance build-ups in other parts of the dynamoelectric machine associated with the shaft, the shaft extension exteriorly of various ones of the dynamoelectric machine may not be constant. Therefore, if the lint shield was pushed or moved along the shaft for a certain distance, the lint shield may be mislocated so that end play movement of the shaft might displace the lint shield from the opening which, of course, may effect a disadvantageous or undesirable result deleterious to proper dynamoelectric machine operation, as discussed in the patent. It is believed that if an instantaneous position of the lint shield was ascertained as it was moved along the shaft with respect to an adjacent part of the dynamoelectric machine, the lint shield could then be advanced through a predetermined distance or travel from the ascertained instantaneous position to the selected position therefor on the shaft.

SUMMARY OF THE INVENTION

Among the several objects of the invention may be noted the provision of apparatus, methods of setting-up apparatus, methods of operating apparatus, methods for manufacturing a prime mover, and methods for assembling components to a rotatable assembly for a prime mover which overcome the aforementioned disadvantageous or undesirable results, as well as others; the provision of such apparatus and methods in which misalignment of the components upon engagement thereof with the rotatable assembly is resiliently resisted and automatically compensated; the provision of such apparatus and methods in which components may be accurately located in a selected position on an end portion of the rotatable assembly irrespective of the extention length thereof; the provision of such apparatus and methods in which components may be disposed in opposite end portions of the rotatable assembly in gripping engagement therewith without appreciably displacing it along its rotational axis in the prime mover; the provision of such apparatus and methods having means adjustable to accept prime movers of various sizes or lengths; and the provision of such apparatus which is simplistic in design and operation, economically manufactured, and easily assembled. These as well as other objects and features of the present invention will be in part apparent and in part pointed out hereinafter.

In general, a method in one form of the invention is provided for manufacturing a dynamoelectric machine. In this manufacturing method, there is assembled in the dynamoelectric machine a rotatable assembly in the dynamoelectric machine a rotatable assembly with its axial movement generally along its axis of rotation predeterminately limited. The dynamoelectric machine is disposed between a pair of opposed means operable generally for mounting a pair of components carried thereby in gripping engagement about a pair of opposite end portions of the rotatable assembly, and the mounting means are subjected to generally constant equal and opposite forces for actuating them so as to guide the components onto and along the opposite end portions in the gripping engagement therewith toward a pair of selected positions on the rotatable member without appreciably displacing it along its axis.

Also in general and in one form of the invention, another method is provided for manufacturing a prime mover. In this manufacturing method, a rotatable assembly is mounted for rotation within the prime mover with axial movement therein of the rotatable assembly predeterminately limited. Components are then pressed generally simultaneously and axially onto the opposite end portions of the rotatable assembly and the opposing forces of the press-fit between the components and the opposite end portions are maintained approximately equal so as to generally prevent the axial movement of the rotatable assembly in the prime mover.

There is also provided, in general and in one form of the invention, a method of assembling a pair of components in gripping engagement generally about opposite end portions of a rotatable assembly of a prime mover. In this assembly method, the opposite end portions of the rotatable assembly and the components are disposed generally equidistantly and coaxially with respect to each other with the rotatable assembly having the capacity for displacement only to a limited degree generally along its axis of rotation in the prime mover. The components are then moved in response to generally constant equal and opposed forces applied thereto onto the opposite end portions in gripping engagement therewith and toward a pair of preselected mounted locations thereon without appreciably displacing the rotatable assembly along its axis.

Also in general, a method in one form of the invention is provided for operating apparatus for mounting a generally annular member in gripping engagement at a selected position on a rotatable shaft of a prime mover and generally in spaced relation with a wall of the prime mover about an opening therein through which the shaft extends. In this operating method, means is actuated for guiding the member onto the shaft and driving it therealong toward the opening, and a part of the guiding and driving means is engaged in a locating position on the wall as the member is driven along the shaft. At least another part of the guiding and driving means is then moved relative to the first named part thereof in its locating position for further driving the member a predetermined distance along the shaft toward the selected mounted position in gripping engagement therewith wherein at least a part of the member is disposed within the opening in the spaced relation with the wall.

There is also provided, in general and in one form of the invention, a method of assembling a generally annular member in gripping engagement at a selected position on a shaft. In this assembling method, the member is guided generally coaxially onto an end portion of the shaft into the gripping engagement therewith, and the member is moved generally coaxially along the shaft toward the selected position. An instantaneous location of the member is sensed as it is being moved along the shaft with respect to means associated with the shaft for housing it, and the member is then advanced through a predetermined distance from the sensed instantaneous location of the member into the selected position therefor.

In general, apparatus in one form of the invention is provided for mounting a pair of components in gripping engagement about a pair of opposite end portions of an assembly rotatable about its axis in a prime mover. In this apparatus, means is provided for supporting the prime mover in a selected position, and a pair of opposed means is movable relative to the supporting means and operable generally for guiding the components onto the opposite end portions of the assembly in gripping engagement therewith and for driving the components therealong toward a pair of selected mounted positions without appreciably displacing the assembly along its axis in the prime mover.

There is also provided apparatus, in general and in one form of the invention for assembling a generally annular member in gripping engagement and generally coaxially about a selected position on a shaft. In this apparatus, a pair of means are conjointly and relatively movable axially with respect to the shaft and operable generally for guiding the member generally coaxially onto an end portion of the shaft and for driving the member therealong to its selected position. Means is movable in one of the guiding and driving means and mounted generally in limited universal movement relation to the other of the guiding and driving means for seating the member and for accommodating coaxial misalignment of the member in the event thereof upon its engagement with the shaft, and means is provided for resiliently resisting the universal movement of the seating and accommodating means to compensate for the coaxial misalignment of the member. Means is provided on the one guiding and driving means for engaging a part associated with the shaft for housing it to arrest the conjoint movement of the guiding and driving means as the member is being driven along the shaft, and means is also provided for predeterminately arresting the movement of the other guiding and driving means relative to the one guiding and driving means thereby to locate the member at its selected position on the shaft when the engaging means is engaged with the housing part.

Also in general, there is provided in one form of the invention apparatus for assembling a generally annular member in gripping engagement on a shaft. In this apparatus, means is movable generally coaxially with respect to the shaft for guiding the member onto an end portion of the shaft and into the gripping engagement therewith. The guiding means includes means for seating engagement with the member and means for mounting the seating means generally in limited universal movement relation with the guiding means to accommodate misalignment of the member in the event thereof when it is engaged with the shaft. Means is also included in the guiding means for resiliently resisting the universal movement of the seating means to compensate for member misalignment.

BRIEF DESCRIPTION OF THE DRAWINGS

Corresponding reference characters indicate corresponding parts throughout the several views of the drawings.

The exemplifications set out herein illustrate the preferred embodiments of the invention in one form thereof, and such exemplifications are not to be construed as limiting in any manner the scope of the invention.

DETAILED DESCRIPTION OF THE PREFERRED EMBODIMENTS

Figure 1:
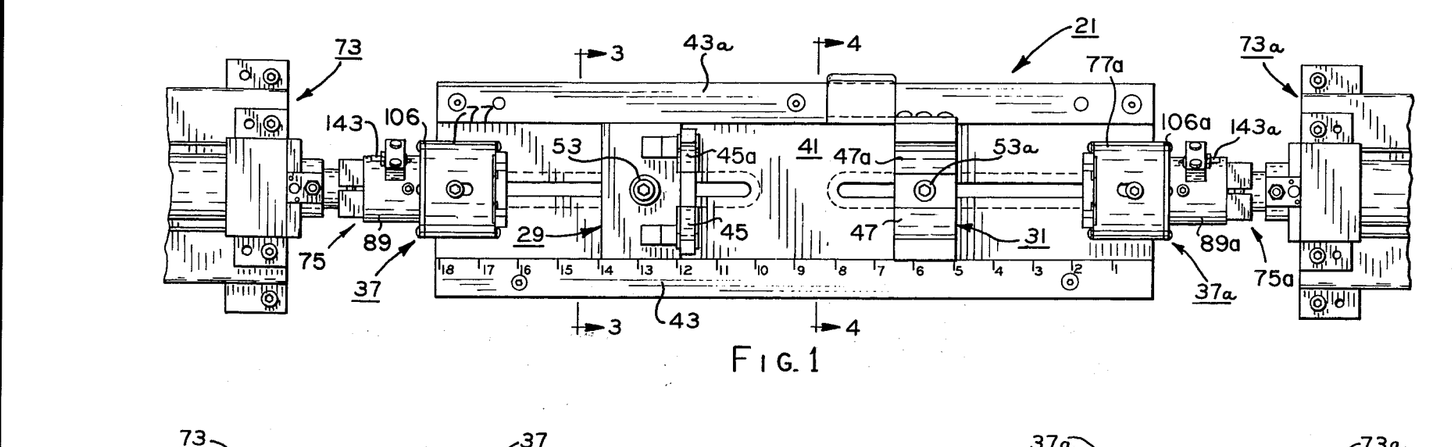
FIG. 1 is a plan view of apparatus in one form of the invention for use in manufacturing prime movers such as dynamoelectric machines, and assembling components thereof and teaching principles for practicing methods of manufacturing and methods of assembling in one form of the invention, respectively.
Figure 2:
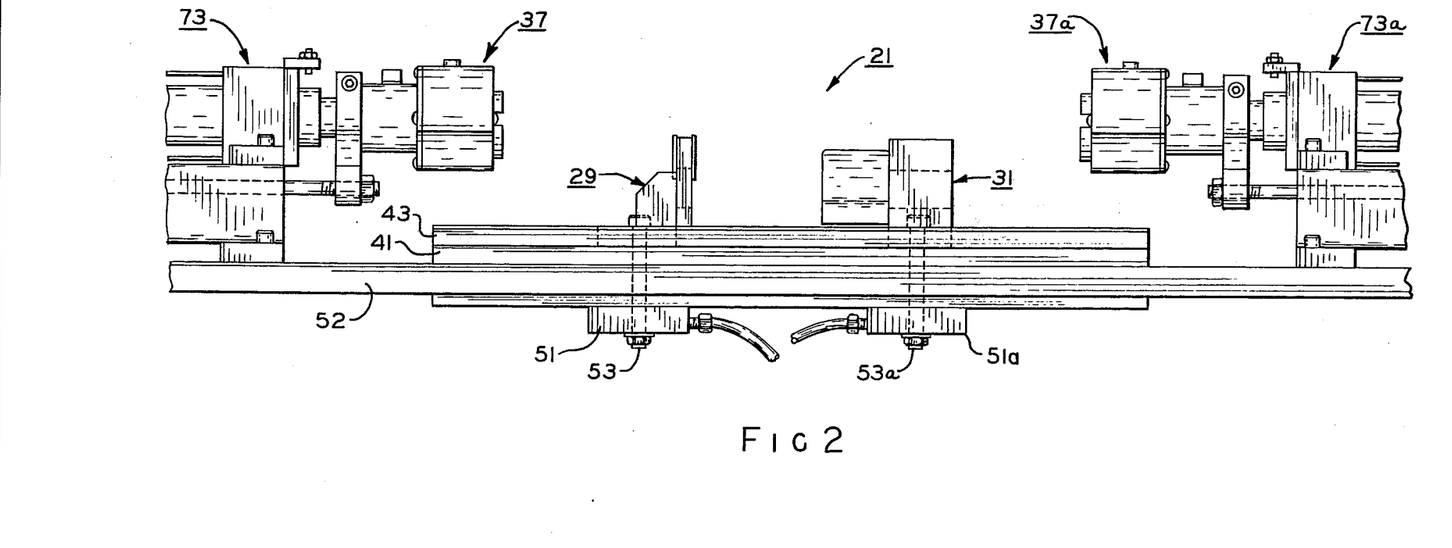
FIG. 2 is a front elevational view of the apparatus of FIG. 1.
Figure 9:
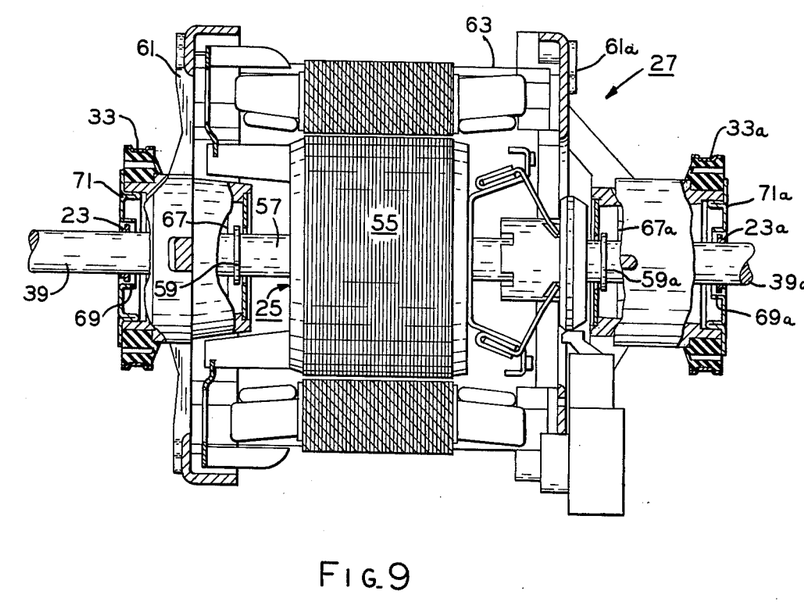
FIG. 9 is a plan view, partially in section, of a prime mover which may be utilized with the apparatus of FIG. 1.

Referring now to the drawings in general, there is illustrated a method of setting-up apparatus 21 (FIGS. 1–5) for assembling components, such as generally annular members 23 including lint shields for instance (FIG. 9), onto a rotatable assembly 25 of a prime mover, such as a dynamoelectric machine 27 or the like. In this setting-up method, a spacing relation is determined between a pair of means, such as supports 29, 31 or the like, for supporting engagement with a pair of selected locations, such as resilient mounting rings 33, 33a on the prime mover or dynamoelectric machine 27, with the supporting means or supports 29, 31 adapted to be movable on apparatus 21 between a pair of opposed means, such as a pair of heads 37, 37a or the like, operable generally for assembling the components or annular members 23 onto a pair of opposite end portions 39, 39a of rotatable assembly 25 (FIGS. 1, 2 and 9). Support 29, 31 are movable to the set-up position with the determined spacing relation therebetween so that the opposite end portions 39, 39a of rotatable assembly 25 will be generally equally spaced from the assembling means or heads 37, 37a when the selected locations or resilient mounting rings 33, 33a of dynamoelectric machine 27 are mounted to the supports in their set-up position. While mounting rings 33, 33a are illustrated for purposes of disclosure as the pair of spaced locations on dynamoelectric machine 27 for locating engagement with supports 29, 31, it is contemplated that other portions or parts of a dynamoelectric machine may be utilized as such spaced locations within the scope of the invention.

Figures 3, 5:
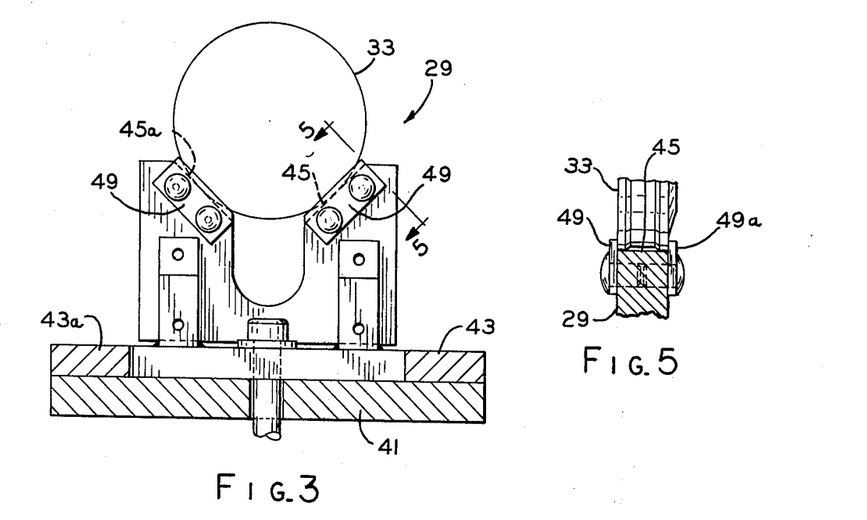
FIGS. 3 and 4 are sectional views taken along lines 3—3 and 4—4, respectively, of FIG. 1.
FIG. 5 is a sectional view taken generally along lines 5—5 of FIG. 3.
Figure 4:
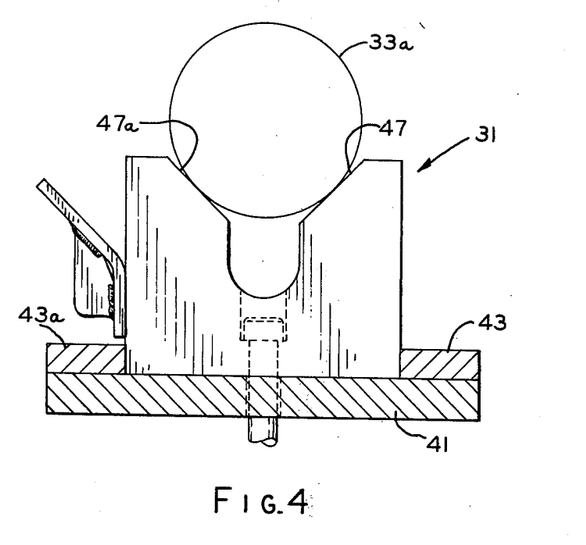

More particularly, supports 29, 31 are slidably mounted on a slotted base plate 41 between a pair of side or guide rails 43, 43a thereon which extend generally axially with respect to heads 37, 37a, as shown in FIGS. 1, 3 and 4, and guide rail 43 may be scaled along its length, if desired (as best seen in FIG. 1). Supports 29, 31 are each provided with a pair of generally opposed locating surfaces 45, 45a and 47, 47a which are angularly spaced with respect to each other for centering or locating purposes, and when the desired spacing relation is determined between the supports, the peripheral surfaces of opposite mounting rings 33, 33a of dynamoelectric machine 27 may be seated or located on the respective locating surfaces of the supports. In this manner, the location of the peripheral surfaces of mounting rings 33, 33a on locating surfaces 45, 45a and 47, 47a of supports 29, 31 coaxially locates or axially aligns opposite end portions 39, 39a of rotatable assembly 25 of dynamoelectric machine 27 with opposite heads 37, 37a on apparatus 21. A pair of retainer plates 49, 49a are attached by suitable means to opposite sides of support 29 adjacent locating surface 45 thereof for engagement with the opposite ends of mounting ring 33 thereby to prevent lengthwise displacement of dynamoelectric machine 27 relative to supports 29, 31 when the peripheral surfaces of end rings 33, 33a are disposed on locating surfaces 45, 45a and 47, 47a of the supports, respectively, as shown in FIGS. 3 and 5. Of course, another pair of retainer plates 49, 49a may also be similarly disposed on opposite sides of support 29 adjacent its locating surface 45 for the lengthwise displacement preventing engagement with mounting ring 33 of dynamoelectric machine 27 if desired, as shown in FIG. 3. Locating surfaces 47, 47a of support 31 is provided with a length, i.e., from left-to-right as seen in FIG. 1, which is predeterminately greater than that of support 29 in order to accommodate dynamoelectric machines of several different lengths, as discussed later. The shapes of supports 29, 31 are shown herein only for purposes of disclosure, and it is contemplated that other supports of different shapes and having different locating surfaces may be utilized within the scope of the invention.

Another setting-up method to attain the desired spacing relation between supports 29, 31 is to dispose dynamoelectric machine 27 thereon with its mounting rings 33, 33a engaged with locating surfaces 45, 45a and 47, 47a of the supports, and then generally conjointly move the supports and the dynamoelectric machine axially on support plate 41 between guide rails 43, 43a to the set-up position. In the set-up position, the opposite end portions 39, 39a are disposed generally equidistantly from opposite heads 37, 37a on apparatus 21, and the scale on guide rail 43 provides a convenient determination of such equidistant relation when supports 29, 31 and dynamoelectric machinee 27 are generally conjointly and adjustably moved axially with respect to the opposite heads. When supports 29, 31 are adjustably moved relative to each other so as to spaced apart in the determined spaced and also in the set-up position, they may be locked or releasably retained against movement therefrom by a pair of pancake or locking cylinders 51, 51a, FIG. 2.

Locking cylinders 51, 51a are well known to the arts and, as illustrated herein for purposes of disclosure, may be a Mack Pancake Cylinder No. 1018 distributed by Affiliated Control Co., Brookfield, Illinois. Locking cylinders 51, 51a are slidably mounted to the lower side of a foundation or bench plate 52 on which apparatus 21 is mounted, and a pair of nut and bolt assemblies 53, 53a extend through slots in base plate 41 and foundation plate 52 between supports 29, 31 and cylinders 51, 51a, respectively, retaining them against displacement from the base plate and the foundation plate, respectively. A pressure fluid may be supplied to locking cylinders 51, 51a to actuate them wherein supports 29, 31 are urged through nut and bolt assemblies 53, 53a into locating engagement with base plate 41 between opposite guides 43, 43a, thereby to maintain in their set-up position. Of course, upon release of the pressure fluid applied to cylinders 51, 51a, they are conjointly movable or slidable with supports 29, 31 to their respective set-up positions and/or to adjust their determined spacing relation.

Turning now again to the drawings in general and recapitulating, at least in part, with respect to the foregoing discussion, a method in one form of the invention is illustrated for manufacturing dynamoelectric machine 27. In this manufacturing method, rotatable assembly 25 is assembled in dynamoelectric machine 27 with the axial movement of the rotatable assembly generally along its axis of rotation predeterminately limited (FIG. 9). Dynamoelectric machine 27 is disposed between a pair of opposed means, such as heads 37, 37a, operable generally for mounting a pair of components, such as annular members 23, 23a, carried thereby in gripping engagement about end portions 39, 39a of the rotatable assembly. Mounting means or heads 37, 37a are subjected to generally constant equal and opposite forces for actuating them so as to guide annular members 23, 23a onto and along opposite end portions 39, 39a in the gripping engagement therewith toward a pair of selected positions on rotatable member 25 without appreciably displacing it along its axis (FIGS. 1, 2 and 9).

More particularly and with reference again to FIG. 9, rotatable assembly 25 of dynamoelectric machine 27 is generally constituted by a rotor 55, a shaft 57 on which the rotor is mounted, and a pair of thrust washers or bearings 59, 59a mounted to the shaft. Shaft 57 is journaled in a pair of opposite end frames 61, 61a which are carried by a plurality of beams 63 or the like suitably supported in a stator 65 mounted about rotor 55. Thrust washers 59, 59a are predeterminately spaced with respect to a pair of abutments 67, 67a or the like on end frames 61, 61a so as to predeterminately limit the amount of axial movement of shaft 57 generally along the axis of rotation of rotatable assembly 25 in dynamoelectric machine 27. This limited axial movement of rotatable assembly 25 is referred to as end play and is well known in the art. Mounting rings 33, 33a are respectively mounted to end frames 61, 61a adjacent the opposite ends thereof, and opposite end portions 39, 39a rotatable assembly 25 are generally constituted by opposite shaft extensions extending through a pair of openings 69, 69a provided through walls or closures 71, 71a disposed on the end frames adjacent the mounting rings. Annular members or lint shields 23, 23a are shown disposed in their selected or mounted positions in gripping engagement with shaft end portions 39, 39a and at least in part within the openings in closed spaced relation with the walls about the openings. The selected positions of annular members 23, 23a on shaft end portions with respect to openings 69, 69a in walls 71, 71a are critical with respect to the end play of rotatable assembly 25 in dynamoelectric machine 27 since at least a part of the annular members must be in close space relation with the walls about the openings to prevent the passage therethrough of lint which may accumulate along shaft extensions 39, 39a. Dynamoelectric machine 27 is generally the same as that disclosed in U.S. Pat. No. 3,855,489 issued Dec. 17, 1974 to Doran D. Hershberger, and reference may be had to this patent if a more detailed explanation of its construction and operation is desired. While dynamoelectric machine 27 and annular members 23, 23a are illustrated for purposes of disclosure, it is contemplated that other dynamoelectric machines and annular members of other shapes and for other purposes may be utilized with apparatus 21 and the methods set forth herein are within the scope of the invention.

Figure 8:
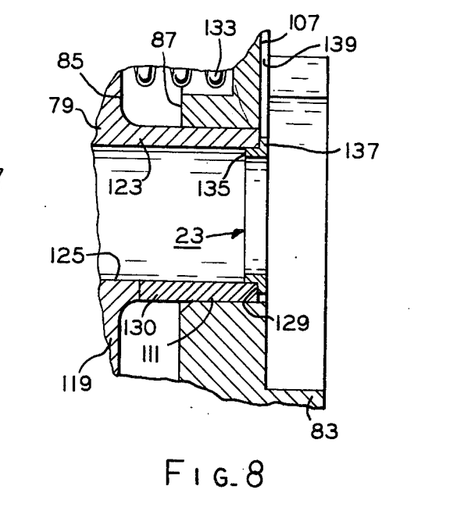
FIG. 8 is a greatly enlarged fragmentary view taken from FIG. 7.
Figure 12:
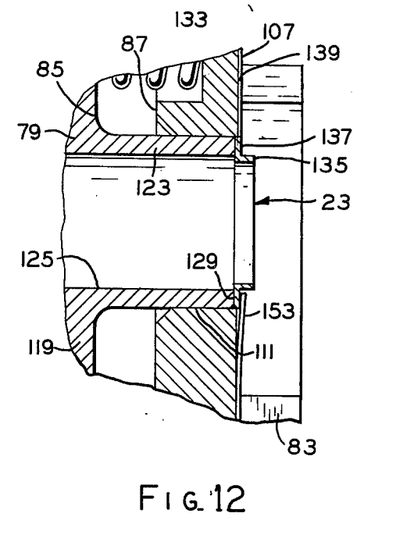
FIG. 12 is a greatly enlarged fragmentary view taken from FIG. 10.

In this manufacturing method, when dynamoelectric machine 27 is disposed in apparatus 21 between heads 37, 37a thereof, mounting rings 33, 33a are located on locating surfaces 45, 45a and 47, 47a of supports 29, 31 in their set-up positions so that the shaft end portions 39, 39a are generally coaxial with and equidistantly spaced from the heads, as previously discussed. Annular members 23, 23a are manually disposed by an operator of apparatus 21 in assembled or supporting relation on heads 37, 37a, as shown in FIGS. 8 and 12 and discussed hereinafter, and a pressure fluid under a generally constant pressure is subjected to a pair of reciprocally movable, opposed, actuating cylinders 73, 73a on which heads 37, 37a are respectively carried, FIG. 1. Cylinders 73, 73a are of a type well known to the art and are mounted to foundation plate 52 by suitable means adjacent the opposite ends of base plate 41 as best seen in FIG. 2. In this manner, the constant pressure acting on opposite cylinders 73, 73a results in generally constant equal and opposed forces for actuating heads 37, 37a and annular members 23, 23a thereon toward each other and the shaft opposite ends 39, 39a for mounting the annular members thereabout. In other words, actuation of apparatus 21, as discussed above, presses or slip-fits annular members 23, 23a onto opposite end portions 39, 39a of shaft 57, and the opposing forces of the press or slip-fit between the annular members and shaft end portions are maintained approximately equal so as to prevent the general axial movement of rotatable assembly 25 in dynamoelectric machine 27. Of course, this mounting of annular members 23, 23a to rotatable member 25 without appreciably moving it along its axis of rotation in dynamoelectric machine 27 generally prevents the engagement of thrust washers 59, 59a with their adjacent end frame abutments 67, 67a; therefore, the mounting forces established by cylinders 73, 73a can not be exerted onto the thrust washers which, of course, might be effective to bend or otherwise distort them and deleteriously affect the subsequent operation of dynamoelectric machine 27.

Referring again in general to the drawings and also recapitulating, apparatus 21 in one form of the invention is provided for mounting a pair of components, such as annular members 23, 23a in gripping engagement about a pair of opposite end portions 39, 39a of an assembly 25 rotatable about its axis in a prime mover or dynamoelectric machine 27 (FIGS. 1–5 and 9). In apparatus 21, means, such as supports 29, 31, are provided for supporting dynamoelectric machine 27 in a selected position, and a pair of opposed means, such as heads 37, 37a, are movable relative to the supporting means or supports 29, 31 and operable generally for guiding annular members 23, 23a onto opposite end portions 39, 39a of rotatable assembly 25 in the gripping engagement therewith and for driving the annular members therealong toward a pair of selected mounted positions without appreciably displacing the assembly along its axis in dynamoelectric machine 27.

Further in general, apparatus in one form of the invention, such as head 37 (FIGS. 6–8), is provided for assembling annular member 23 in gripping engagement and generally coaxially about a selected position on shaft 57 (FIG. 9). Head 37 has a pair of means, such as a plunger 75 and a cup 77, conjointly and relatively movable axially with respect to shaft 57 and operable generally for guiding annular member 23 generally coaxially onto end portion 39 of the shaft and for driving the annular member therealong to its selected position. Means, such as a seating member 79, is movable in one of the guiding and driving means, such as cup 77, and mounted generally in limited universal movement relation to the other of the guiding and driving means, such as plunger 75, for seating annular member 23 and for accommodating coaxial misalignment of the annular member in the event thereof upon its engagement with shaft 57. Means, such as an O-ring 81, is provided for resiliently resisting the universal movement of the seating and accommodating means or seating member 79, to compensate for the coaxial misalignment of annular member 23. Means, such as an abutment 83, is provided on cup 77 for engaging a part, such as wall 71 on end frame 61 of dynamoelectric machine 27, associated with shaft 57 for housing it to arrest the conjoint movement of plunger 75 and cup 77 as annular member 23 is driven along the shaft, and means, such as a pair of predeterminately spaced apart abutments 85, 87, are provided for predeterminately arresting the movement of the plunger relative to the cup thereby to locate the annular member at its selected position on the shaft when the engaging means or abutment 83 is engaged with the housing part or end frame wall 71.

Figure 6:
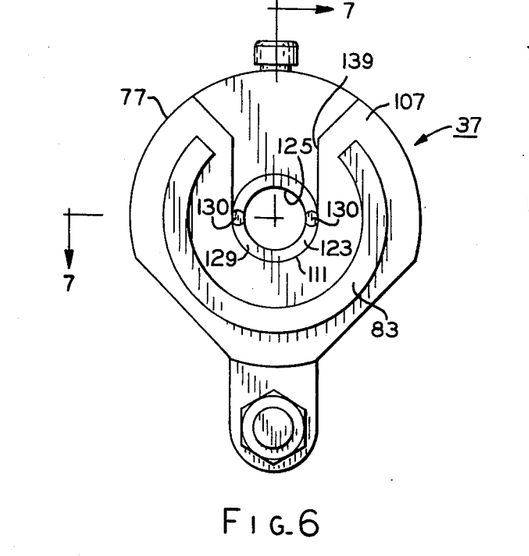
FIG. 6 is a side elevational view of a mounting head of the apparatus of FIG. 1 in one form of the invention and teaching principles for practicing methods of assembling components in one form of the invention.
Figure 7:
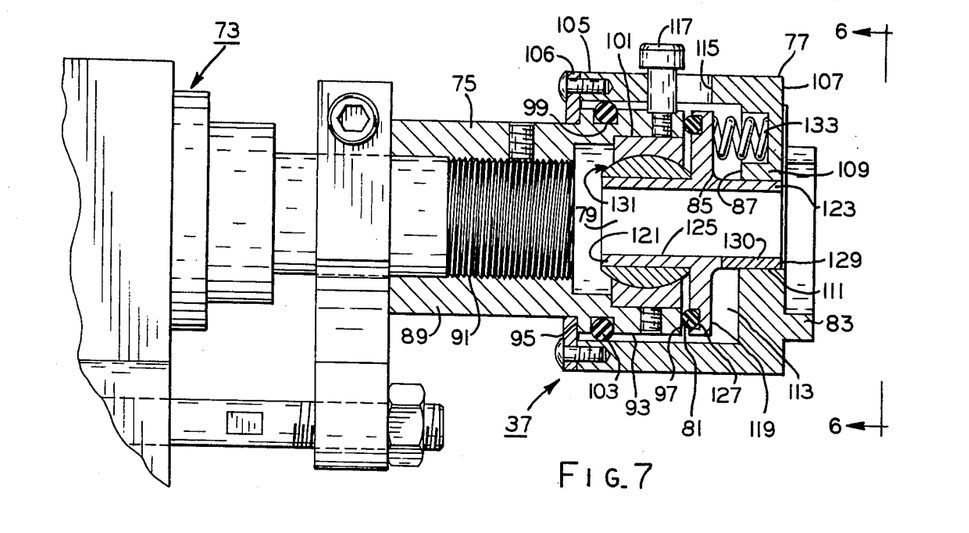
FIG. 7 is a sectional view taken along lines 7—7 of FIG. 6.

For purposes of simplifying the disclosure, only the component parts of head 37 are illustrated in FIGS. 6–8 and described in detail hereinafter; however, since heads 37, 37a are of the same construction, the corresponding parts of head 37a will be designated by the letter a for clarity whenever necessary in the following description. More particularly and with specific reference to FIGS. 6 and 7, plunger 75 includes a generally cylindric stem 89 which is mounted by suitable means, such as internal threads 91 for instance, to the cooperating piston shaft of cylinder 73, as is well known to the art. Of course, head 37a is similarly mounted to the piston shaft of cylinder 73a. A peripheral or annular sidewall 93 is integrally formed on plunger 75 being disposed radially outwardly of stem 89, and the sidewall is connected between an annular shoulder 95 and an opposite end wall or face 97. An annular groove 99 is provided in peripheral surface 93 adjacent shoulder 95, and a recess 101 is provided through end wall 97. Another O-ring 103 is seated in groove 99 and generally constitutes means for resiliently resisting conjoint displacement of cup 77 with seating member 79 relative to plunger 75 and for restoring the cup with the seating member to its aligned position, as discussed hereinafter.

Cup 77 is provided with a generally annular sidewall 105 at least a portion of which is telescopically arranged or generally coaxial with peripheral sidewall 93 of plunger 75, and O-ring 103 is engaged with the cup sidewall. An annular retainer 106 is connected by suitable means to the leftward or free end of cup sidewall 105 for engagement with plunger shoulder 95, and a base or end wall 107 is generally axially spaced from plunger end wall 97 and integrally formed with the cup sidewall at the rightward end thereof, as best seen in FIG. 7. A re-entrant sleeve or hub 109 having a bore 111 therethrough is integrally formed with cup end wall 107 generally centrally thereof, and abutment 87 is provided on the free end of the re-entrant hub within a chamber 113 defined between plunger 75 and cup 77. Cup sidewall 105 is provided with a generally axially extending guide slot 115 therein, and a guide pin 117, which is threaded or otherwise connected with plunger 75, extends radially therefrom through the guide slot in sliding and guiding engagement therewith to generally prevent rotational movement of cup 77 with respect to plunger 75 while accommodating generally axial movement or displacement therebetween.

Seating member 79 is provided with a generally annular, radially extending flange 119 integrally formed between a pair of oppositely extending extensions or sleeves 121, 123, and a bore 125 is provided through the sleeves for receiving annular member 23 and at least a part of shaft end portion 39 when the annular member is mounted thereto, as discussed hereinafter.

Abutment 85 is provided on seating member 79 generally at the juncture of flange 119 with sleeve 123 in opposed or facing relation with hub abutment 87. Flange 119 is disposed adjacent plunger end wall 97, and an annular groove 127 is provided in the flange facing the plunger end wall. O-ring 81 is disposed in flange groove 127 and is resiliently engaged between flange 119 and plunger end wall 97 for positioning compensation purposes to maintain annular member 23 generally coaxial with shaft end portion 39 when engaged therewith, as discussed hereinafter. Sleeve 123 is slidably and guidably received in hub bore 111 of cup end wall 107, and the free end of the sleeve defines a seat 129 for seating engagement with annular member which is shown in FIG. 8 disposed in the sleeve bore 125 and seated on the seat 129. A plurality of magnets 130 are disposed in the free end of sleeve 123 intersecting with seat 129 for magnetic attraction engagement with annular member 23, as shown in FIG. 6 and as discussed hereinafter. Sleeve 121 is mounted to a universal bearing assembly, indicated generally at 131, which in turn is mounted within recess 101 provided through plunger end wall 97, and the bearing assembly generally constitutes means for mounting seating member 79 generally in limited universal movement relation with plunger 75 to accommodate misalignment of annular member 23 in the event thereof when it is engaged with shaft 57, as discussed in detail hereinafter.

A plurality of means, such as springs 133, are biased between flange 119 of seating member 79 and cup end wall 107 within chamber 113 urging cup 77 toward its at-rest position on plunger 75 so that cup retainer 106 is generally axially biased into displacement preventing engagement with plunger shoulder 95. It may be noted that sleeve bore 125 of seating member 79 is adapted to be generally coaxially arranged or aligned with the shaft end portion 39 of dynamoelectric machine 27 by the resilient engagement of O-ring 89 between seating member flange 119 and plunger end wall 97 and the resilient engagement of O-ring 103 between plunger sidewall 93 and cup sidewall 105. Further, in the at-rest position of cup 77 on plunger 75, it may also be noted that seating member abutment 85 and hub abutment 87 are generally axially spaced apart a predetermined distance which defines the extent of the relative movement between the plunger and the cup, as discussed hereinafter. Although abutments 85, 87 are shown for purposes of disclosure as being disposed or formed on seating member 89 and hub 109 for purposes of disclosure, it is contemplated that the abutments could be otherwise disposed within the scope of the invention. For instance, if the radial extent of plunger end wall 97 was to be increased, an annular shoulder or a plurality of fingers or lands generally forming an annular shoulder could be integrally provided on cup sidewall 105 and predeterminately spaced from the plunger end wall for motion limiting or arresting engagement therewith.

Annular member 23, FIG. 8, is generally constituted by a sleeve portion 135 integrally formed with a generally radially extending flange portion 137, and a peripheral edge of flange portion 137 is supported or seated in a loading groove or recess 139 provided in the exterior face or side of cup end wall 107 generally about hub bore 111 therein. In this manner, flange portion 137 of annular member 23 is predeterminately disposed in seating engagement with seat 129 on seating member sleeve 123 with sleeve portion 135 of the annular member extending into seating member bore 125. When annular member 23 is so disposed on or assembled to head 37, flange portion 137 of the annular member is attracted into magnetic holding engagement with magnets 130 which intersect seating member seat 129 thereby to releasably maintain the annular member against displacement from its assembled position supported on end wall 107 of cup 77. Abutment 83 in the form of an interrupted ring is provided on the exterior side of cup end wall 107 extending generally normally therefrom a predetermined distance for engagement with wall 71 of end frame 61, FIG. 9, as previously mentioned.

To complete the description of head 37 and apparatus 21, a Vlier pin 143, as shown in FIG. 1, is mounted to stem 89 of plunger 75 for engagement with retainer 106 of cup 77, and if such engagement of the Vlier pin with the cup retainer is not effected within a preselected time after apparatus 21 is actuated, an alarm circuit (not shown) may be energized thereby to indicate improper locationing of annular member 23 on shaft 57.

From the foregoing and referring again to the drawings in general, it may be observed that apparatus, such as heads 37 or 37a, is provided in one form of the invention for assembling generally annular member 23 in gripping engagement in shaft 57 (FIGS. 6-8). In this apparatus or heads 37 or 37a means, such as plunger 75, is movable generally coaxially with respect to shaft 57 for guiding annular member 23 onto end portion 39 of the shaft and into gripping engagement therewith. Guiding means or plunger 77 includes: means, such as seating member 79, for seating engagement with annular member 23; means, such as bearing assembly 131, for mounting the seating means or seating member generally in universal movement relation with plunger 77 to accommodate misalignment of the annular member in the event thereof when it is engaged with the shaft; and means, such as O-ring 81 and/or O-ring 103, for resiliently resisting the universal movement of the seating member to compensate for misalignment of the annular member.

OPERATION

With supports 29, 31 adjusted to their set-up position on apparatus 21 and the component parts thereof in their original or at-rest positions as shown in the drawings and as described hereinbefore, dynamoelectric machine 27 may be placed on the supports so that its mounting rings 33, 33a are disposed on locating surfaces 45, 45a and 47, 47a of the supports with the mounting ring 33 being embraced by retainer plates 49, 49a. In this manner, dynamoelectric machine 27 is predeterminately positioned or disposed on apparatus 21 so that opposite end portions 39, 39a of shaft 57 in the dynamoelectric machine are generally equidistant or equally spaced from heads 37, 37a and also generally coaxial therewith.

The operator may then load annular members 23, 23a so that their sleeve portions 135, 135a extend generally coaxially into bores 125, 125a of seating members 79, 79a in heads 37, 37a, and flanges 137, 137a of the annular member are disposed in seating engagement with seats 129, 129a on the seating members in magnetic holding engagement with magnets 120, 120a thereof, as shown in FIG. 8. When so loaded to heads 37, 37a, annular members 23, 23a are also generally equidistantly spaced from opposite end portions 39, 39a of dynamoelectric machine shaft 57 and generally coaxial therewith. Of course, such loading of annular members 23, 23a to heads 37, 37a may be effected by the operator prior to the disposition of dynamoelectric machine 27 on supports 29, 31 of apparatus 21, as above described, if desired.

The operator may now effect generally simultaneous application of generally constant and equal fluid pressures to actuating cylinders 73, 73a, FIGS. 1 and 2, in a manner well known to the art to establish the generally constant, equal and opposing forces for moving head 37, 37a through a predetermined or selected linear or axially directed stroke or travel toward dynamoelectric machine 27 mounted therebetween on supports 29, 31 of apparatus 21, as previously mentioned. Assuming for purposes of discussion that annular members 23, 23a in heads 37, 37a are properly aligned so as to be coaxial with opposite ends 39, 39a of dynamoelectric machine shaft 57, the driven movement of the heads initially moves the annular members coaxially onto the opposite ends of the dynamoelectric machine shaft in gripping engagement therewith and then therealong toward the selected positions of the annular members. As heads 37, 37a drive annular members 23, 23a coaxially along opposite end portions 39, 39a of dynamoelectric machine shaft 57, abutments 83, 83a on the heads engage or seat on walls 71, 71a of dynamoelectric machine end frames 61, 61a generally simultaneously thereby to sense or predeterminately ascertain instantaneous locations or positions of the annular members. Of course, the engagement of abutments 83, 83a with walls 71, 71a also serves to arrest the conjoint movement of cups 77, 77a with plungers 75, 75a of heads 37, 37a, respectively, and the forces of actuating cylinders 73, 73a thereafter effects movement or advancement of the plungers through a predetermined stroke or travel relative to the cups. Such relative movement between plungers 75, 75a and cups 77, 77a is, of course, predetermined by the axial spacing of abutments 85, 87 and 85a, 87a on seating members and cup hubs 79, 109 and 79a, 109a, respectively, as previously mentioned. Plungers and seating members 75, 79 and 75a, 79a are conjointly movable in response to the opposing forces applied thereto by actuating cylinders 73, 73a relative to cups 77, 77a until abutments 85, 85a are moved through the predetermined stroke or lost motion into abutting engagement with abutments 87, 87a on the cup. Upon the engagement of abutments 85, 85a with the abutments 87, 87a, the relative movement of plungers 75, 75a with respect to cups 77, 77a is, of course, arrested, and this relative movement of seating members 79, 79a drives annular members 23, 23a from their sensed instantaneous locations along shaft 57 into their selected mounted positions generally within openings 69, 69a of end frame walls 71, 71a of dynamoelectric machine 27 in the desired spaced relation with the end frame walls about the openings.

It may be noted that the generally constant equal and opposing forces exerted by actuating cylinders 73, 73a to effect the generally simultaneous and opposite mounting of annular members 23, 23a in gripping engagement at their selected mounted positions about opposite end portions 39, 39a of dynamoelectric machine shaft 57 generally obviates, or at least predeterminately limits, shifting or axial movement of the dynamoelectric machine shaft along its axis of rotation in dynamoelectric machine 27. Since annular members 23, 23a are so mounted to dynamoelectric machine shaft 57 without appreciably displacing it axially along its axis of rotation, it may also be noted that thrust washers 59, 59a on the dynamoelectric machine shaft are not engaged with their cooperating abutment or bearing surfaces 67, 67a on dynamoelectric machine end frames 61, 61a so as to effect bending or otherwise distorting of the thrust washers which would, of course, deleteriously affect the operation of dynamoelectric machine 27 upon subsequent energization thereof. Further, even if one of thrust washers 59, 59a was engaged with its cooperating end frame surface 61, 61a, it would not be bent or otherwise distorted since the forces applied to dynamoelectric machine shaft 57 during the mounting thereto of annular members 23, 23a are generally constant, equal and opposed.

Upon the location of annular members 23, 23a in their selected mounted positions on opposite end portions 39, 39a of dynamoelectric machine shaft 57, as described above, actuating cylinders 73, 73a may be reciprocally operated so as to conjointly drive or move heads 37, 37a in opposite directions, i.e., to retract or return them to their original or at-rest positions. Of course, springs 133, 133a, FIG. 7, in heads 37, 37a oppose conjoint return or retractile movement of cups 77, 77a with plungers and seating members 75, 79 and 75a, 79a until such return movement of the plungers re-engage their shoulders 95, 95a with cup abutments 106, 106a. Thereafter, plungers and cups 75, 77 and 75a, 77a are conjointly movable as heads 37, 37a are retractively returned to their at-rest positions by actuating cylinders 73, 73a.

During the above-described mounting of annular members 23, 23a onto dynamoelectric machine shaft 57, it was assumed that the annular members were at all times properly aligned or coaxially positioned with respect to the dynamoelectric machine shaft; however, it is, of course, apparent that a slight misalignment may be present between one or both of the annular members and their associated opposite end portions 39, 39a of the dynamoelectric machine shaft. In order to simplify the disclosure, it will now be assumed that only annular member 23 is misaligned during its mounting, and it is understood that each of heads 37, 37a are operable generally in the same manner, as set out hereinafter only with respect to head 37, to compensate or correct such misalignment.

Figure 10:
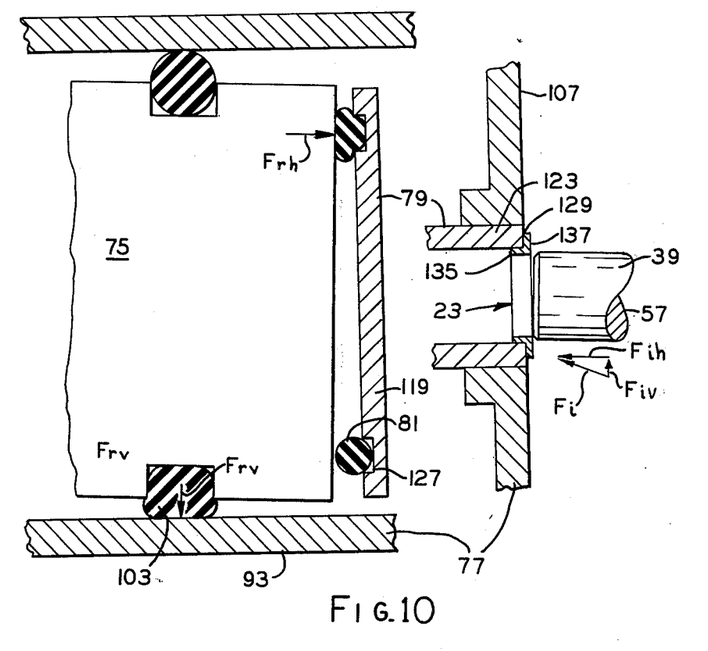
FIG. 10 is a schematic diagram illustrating the tilting accommodation and compensating function of the mounting heads of the apparatus of FIG. 1.

In the event of such misalignment, the engagement of annular member 23 with opposite end portion 39 of dynamoelectric machine shaft 57 will effect rocking, tilting or cocking of the annular member due to the establishment of an interference force Fi upon such misalignment engagement, FIG. 10. This interference force Fi, which is constituted by generally vertical and horizontal force components Fiv and Fih, is transmitted from annular member 23, as it tilts, directly to seating member 79 through the seating engagement of the annular member on seat 129 of the seating member. Since seating member 79 is mounted for universal movement by bearing assembly 131 in plunger 75, the seating member is conjointly movable with annular member 23 generally in response to interference force horizontal component Fih to accommodate the tilting thereof, and, it may be noted that the annular member generally remains in its seated position on seat 129 of the seating member. Further, due to the sliding engagement of sleeve 123 in hub bore 111 of cup 77, the cup is also conjointly movable with seating member 79 upon its accommodation of the tilting motion of annular member 23 generally in response to interference force vertical component Fiv.

Upon the conjoint universal movements of seating member 79 and cup 77 in response to the horizontal component Fih and the vertical component Fiv of interference force Fi applied thereto, flange 119 of the seating member is tilted through bearing assembly 131 thereby to compress O-ring 81 against end wall 97 of plunger 75. In this manner, the tilting action of annular member 23 is also resiliently resisted or opposed, and such compression of O-ring 81 is effective to establish a resilient or reaction force Frh generally equal and opposite to the horizontal component Fih of interference force Fi. It may be noted that seating member 79 is operable generally to compress O-ring 81 thereby to instantaneously effect the establishment of reaction force Frh, and the magnitude thereof is generally equal to that of the interference force horizontal component Fih. It may also be noted that seating member 79 is operable generally to establish reaction force Frh in a direction generally opposite to that of the interference force horizontal component Fih irrespective of the direction rendered to the interference force Fi due to the interfering engagement of annular member 23 at any particular annular location thereon with end portion 39 of dynamoelectric machine shaft 57.

In addition to the above-mentioned reaction force Frh, it may also be noted that the conjoint universal movement of cup 77 with seating member 79 to accommodate the tilting action or motion of annular member 23, as previously mentioned, is effective to compress O-ring 103 against plunger 75. In this manner, the tilting action of annular member 23 is also resiliently resisted or opposed, and such compression of O-ring 103 is effective to establish another resilient or reaction force Frv generally equal and opposite to the vertical component Fiv of interference force Fi. It may be noted that cup 77 is operable generally in concert with seating member 79 to compress O-ring 103 thereby to instantaneously effect the establishment of reaction force Frv, and the magnitude thereof is generally equal to that of the interference force vertical component Fiv. It may also be noted that cup 77 is operable generally to establish reaction force Frv in a direction generally opposite to that of the interference force vertical component Fiv irrespective of the direction rendered to interference force Fi due to the interfering engagement of annular member 23 at any particular annular location thereon with end portion 39 of dynamoelectric machine shaft 57. Of course, the adjusting conjoint universal movement of seating member 79 and cup 77 relative to plunger 75, as described above, to accommodate and compensate for the tilting action of annular member 23 may be either intermittently effected or generally successively effected as head 37 moves the annular member onto end portion 39 of shaft 37 and then therealong toward its selected mounted position, as previously described.

Figure 11:
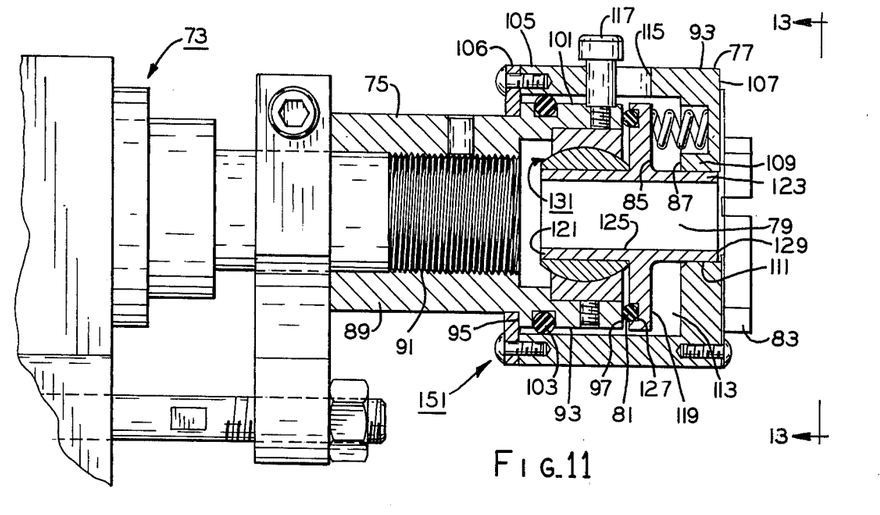
FIG. 11 is a sectional view of an alternative mounting head which may be utilized with the apparatus of FIG. 1.
Figure 13:
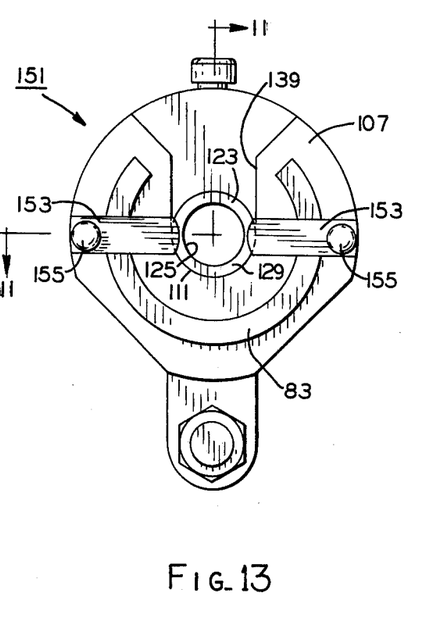
FIG. 13 is an end elevational view of the mounting head of FIG. 11.

Referring now to FIGS. 11, 12 and 13, an alternative mounting head 151 in one form of the invention is shown having generally the same component parts and operating generally in the same manner as the above described mounting head 37; however, in addition to possessing at least some of the advantageous features of mounting head 37, mounting head 151 also has other salient and advantageous features which will be in part apparent and in part pointed out hereinafter.

Instead of being provided with magnets 130 of the above-discussed mounting head 37, mounting head 151 has a pair of opposed spring or resilient fingers or retainers 153 for releasably retaining engagement with annular member 23. Spring fingers 153 have the opposite ends thereof attached by suitable means, such as rivets 155, to the exterior face or side of cup end wall 107, and the opposed adjacent ends of the spring fingers are disposed generally in overlaying relation with seating groove or recess 139 provided in the exterior face of cup end wall 107. If it is desirable to load annular member 23 to head 151 with sleeve portion 135 of the annular member projecting forwardly of cup end wall 107, the operator may slide a peripheral edge of flange portion 137 of the annular member into loading groove 139 so that the flange portion is predeterminately disposed with its peripheral edge in seating engagement in the loading groove. In this manner, flange portion 137 of annular member 23 is disposed in seating engagement with seat 129 on seating member sleeve 123 when the peripheral edge of the annular member flange portion 137 is seated in loading groove 139, and annular member sleeve portion 135 projects forwardly or away from the external face of cup end wall 107. When so disposed in loading groove 139, the opposed adjacent ends of spring fingers 153 are engaged with annular member flange portion 137 thereby to releasably maintain annular member 23 against displacement from the loading groove. Of course, during the operation of apparatus 21, the relative movement of plunger 75 and seating member 79 relative to cup 77 when abutment 83 thereof is in locating engagement with end frame wall 71, as previously described, advances flange portion 137 of annular member 23 through or past the opposed adjacent ends of spring fingers 153 as the annular member is advanced from its sensed instantaneous position toward its selected mounted position on shaft 57.

In view of the foregoing, it is now apparent that apparatus 21, 37, 151, a method of manufacturing a prime mover, a method of assembling components about opposite end portions of a rotatable assembly of a prime mover, and a method of assembling a generally annular member in gripping engagement at a selected position on a shaft are respectively presented meeting the objects and advantageous features set out hereinbefore, as well as others. Further, it is contemplated that changes may be made by those having ordinary skill in the art with respect to the arrangement, shapes, details and connections of the component parts of apparatus 21, 37, 151 as well as in the precise order of the steps in the aforementioned methods without departing from the spirit of the invention or the scope thereof defined by the claims which follow.

What I claim as new and desire to secure by letters patent of the United States is:

1. A method of manufacturing a dynamoelectric machine comprising the steps of:
    a. assembling in the dynamoelectric machine a rotatable assembly with axial movement generally along its axis of rotation predeterminately limited;
    b. disposing the dynamoelectric machine between a pair of opposed means operable generally for mounting a pair of components carried thereby in gripping engagement about a pair of opposite end portions of the rotatable assembly; and
    c. subjecting the mounting means to forces for actuating them so as to guide the components onto and along the opposite end portions in the gripping engagement therewith toward a pair of selected positions on the rotatable member and compensating the mounting means to accommodate misalignment of the components in the event thereof on the opposite end portions of the rotatable member without appreciably displacing it along its axis.

2. The method as set forth in claim 1 wherein the disposing step includes locating the dynamoelectric machine so that the opposite end portions of the rotatable assembly are generally equidistant from the mounting means.

3. The method as set forth in claim 1 comprising the intermediate step of spacing between the mounting means a pair of means for locating the dynamoelectric machine so that the opposite end portions of the rotatable assembly are generally equally spaced from the mounting means and generally coaxial therewith prior to the disposing step.

4. The method as set forth in claim 1 comprising the intermediate step of placing the components with respect to the mounting means so that they may be carried thereby prior to the subjecting and compensating step, respectively.

5. The method as set forth in claim 1 wherein the subjecting and compensating step includes sensing an instantaneous location of each component as it is being guided along the rotatable assembly with respect to a part of the dynamoelectric machine and then advancing each component a predetermined distance from its sensed instantaneous location into the selected positions thereof.

6. A method of manufacturing a prime mover comprising the steps of:
    a. mounting a rotatable assembly for rotation within the prime mover with axial movement therein of the rotatable assembly predeterminately limited; and
    b. pressing a pair of components generally simultaneously and coaxially on the opposite end portions of the rotatable assembly and compensating automatically for coaxial misalignment of the components with respect to the opposite end portions during such pressing so as to generally prevent the axial movement of the rotatable assembly in the prime mover.

7. The method as set forth in claim 6 comprising the intermediate step of locating the prime mover in a selected position between a pair of opposed means operable generally for pressing the components onto the rotatable assembly so that the opposite end portions of the rotatable assembly are predeterminately located generally equidistantly from the pressing means and generally coaxially therewith.

8. A method of assembling a pair of components in gripping engagement generally about opposite end portions of a rotatable assembly of a prime mover comprising the steps of:
    a. disposing the opposite end portions of the rotatable assembly and the components generally coaxially with respect to each other with the rotatable assembly having the capacity for displacement only to a limited degree generally along its axis of rotation in the prime mover; and
    b. moving the components in response to generally constant equal and opposed forces applied thereto onto the opposite end portions in the gripping engagement therewith toward a pair of preselected mounted locations thereon and automatically compensating for coaxial misalignment of the components with respect to the opposite end portions as the components are moved to their preselected mounted locations on the opposite end portions without appreciably displacing the rotatable assembly along its axis in response to the opposed forces acting on the components.

9. The method as set forth in claim 8 wherein the moving and compensating step includes sensing an instantaneous position of each component during its travel along the rotatable assembly and advancing the components a predetermined distance from their respective sensed instantaneous positions into the selected mounted locations thereof.

10. A method of operating apparatus for mounting a generally annular member in gripping engagement at a selected position on a rotatable shaft of a prime mover and in generally close radial spaced relation with a wall of the prime mover about an opening therein through which the shaft extends comprising the steps of:
 a. actuating means for guiding the member onto the shaft in the gripping engagement therewith and driving it along the shaft toward the opening;
 b. engaging a part of the guiding and driving means in a locating position on the wall as the member is driven along the shaft; and
 c. moving at least another part of the guiding and driving means with respect to the first named part thereof in its locating position so as to further drive the member a predetermined distance along the shaft toward the selected mounted position and disposing at least a part of the member within the opening in the close radial spaced relation with the wall.

11. The method as set forth in claim 10 comprising the preliminary step of aligning the shaft with the guiding and driving means.

12. The method as set forth in claim 10 comprising the preliminary step of locating the prime mover on the apparatus so that the shaft is generally coaxially spaced from the guiding and driving means.

13. The method as set forth in claim 10 comprising the preliminary step of providing means for compensating the guiding and driving means in the event of misalignment of the member upon its engagement with the shaft so as to maintain the member generally in coaxial relation with respect to the shaft.

14. A method of assembling a generally annular member in gripping engagement on a shaft extending through an opening in means for rotatably supporting the shaft, said method comprising the steps of:
 a. guiding the member generally coaxially onto an end portion of the shaft into the gripping engagement therewith and moving the member generally coaxially along the shaft toward the opening;
 b. sensing an instantaneous location of the member as it is being moved along the shaft with respect to the rotatably supporting means; and
 c. advancing the member through a predetermined distance from the sensed instantaneous location of the member and disposing at least a part of the member within the opening in spaced relation with the rotatably supporting means about the opening.

15. Apparatus for mounting a pair of components in gripping engagement about a pair of opposite end portions of an assembly rotatable about its axis in a prime mover comprising:
 a. means for supporting the prime mover; and
 b. a pair of opposed means movable with respect to said supporting means and operable generally for guiding the components onto the opposite end portions of the assembly in the gripping engagement therewith and for driving the components therealong without appreciably displacing the assembly along its axis in the prime mover, said guiding and driving means including means for compensating the position of the components in the event of misalignment thereof when engaged with the assembly so as to maintain the components generally coaxial with respect to the opposite end portions, respectively.

16. The apparatus as set forth in claim 15 further comprising means between said guiding and driving means for movably receiving the supporting means.

17. The apparatus as set forth in claim 15 wherein said supporting means is movable to a selected position between said guiding and driving means, and further comprising means for releasably retaining said supporting means in its selected position.

18. The apparatus as set forth in claim 15 further comprising a pair of means for generally simultaneously actuating said guiding and driving means, respectively.

19. The apparatus as set forth in claim 15 wherein each of said guiding and driving means includes means for seating one of the components.

20. The apparatus as set forth in claim 15 wherein said supporting means includes a pair of means spaced apart for engaging a pair of spaced apart selected locations on the prime mover, and the engagement between at least one of said engaging means and one of the selected locations being effective to dispose the opposite end portions of the assembly generally equidistantly from the guiding and driving means and generally coaxially therewith.

21. The apparatus as set forth in claim 20 wherein the other of said engaging means includes a surface adapted for engaging the other of the selected locations, and said at least one engaging means being movable relative to said other engaging means to accommodate a prime mover having selected locations spaced apart by different amounts.

22. Apparatus for assembling a generally annular member in gripping engagement and generally coaxially about a selected position on a shaft comprising:
 a. a pair of means conjointly and relatively movable axially with respect to the shaft and operable generally for guiding the member generally coaxially onto an end portion of the shaft and for driving the member therealong to its selected position;
 b. means movable in one of said guiding and driving means and mounted generally in limited universal movement relation to the other of said guiding and driving means for seating the member and for accommodating coaxial misalignment of the member in the event thereof upon its engagement with the shaft;
 c. means for resiliently resisting the universal movement of said seating and accommodating means to compensate for the coaxial misalignment of the member;
 d. means on said one guiding and driving means for engaging a part associated with the shaft for housing it to arrest the conjoint movement of said guiding and driving means as the member is being driven along the shaft; and e. means for predeterminately arresting the movement of said other guiding and driving means relative to said one guiding and driving means thereby to locate the member at its selected position on the shaft when the engaging means is engaged with the housing part.

23. The apparatus as set forth in claim 22 wherein said resiliently resisting means comprises an O-ring seated between a pair of opposed surfaces on said seating and accommodating means and said other guiding and driving means, respectively.

24. The apparatus as set forth in claim 22 further comprising other means disposed between said guiding and driving means for resiliently resisting displacement movement therebetween effected in response to the universal movement of said seating and accommodating means.

25. The apparatus as set forth in claim 24 wherein said other resiliently resisting means comprises an O-ring disposed generally radially between said guiding and driving means.

26. The apparatus as set forth in claim 22 wherein said seating and accommodating means includes a generally radially extending flange connected between a pair of oppositely extending extensions, one of said extensions being mounted in the limited universal movement relation to said other guiding and driving means and the other of said extensions being movable in said one guiding and driving means, and said resiliently resisting means being disposed between said flange and an adjacent opposing part of said other guiding and driving means.

27. The apparatus as set forth in claim 26 wherein said seating and accommodation means further includes a free end on said other extension defining a seat for seating engagement with the member.

28. The apparatus as set forth in claim 27 wherein said seating and accommodating means further includes a recess in said other extension intersecting said free end thereof for generally coaxially receiving at least a part of the end portion of the shaft upon the engagement of the member therewith.

29. The apparatus as set forth in claim 22 wherein said relative movement arresting means comprises a pair of abutments on said one guiding and driving means and one of said seating and accommodating means and said other guiding and driving means and predeterminately spaced apart, one of said abutments being movable through the predetermined space into engagement with said other of the abutments thereby to arrest the relative movement between said guiding and driving means.

30. The apparatus as set forth in claim 22 further comprising a return spring between said one guiding and driving means and one of said seating and accommodating means and said other guiding and driving means, said return spring being compressed in response to the movement of said other guiding and driving means relative to said one guiding and driving means.

31. The apparatus as set forth in claim 22 further comprising means associated with at least one of said one guiding and driving means and said seating and accommodating means for receiving the member and disposing it generally coaxially with respect to the end portion of the shaft.

32. Apparatus for mounting a generally annular member in gripping engagement at a selected position on an end portion of a rotatable shaft of a dynamoelectric machine generally in selected spaced relation with a wall of the dynamoelectric machine about a first opening therein through which the shaft extends, said apparatus comprising:

a. a head adapted for generally coaxial movement with respect to the shaft toward and away from the end portion thereof, said head including a first annular sidewall, a first end wall connecting with said first sidewall, and a recess in said first end wall;

b. a cup mounted to said head and adapted for conjoint and relative coaxial movement therewith, said cup including a second annular sidewall extending generally coaxially about said first sidewall, a second end wall connecting with said second sidewall and axially spaced from said first end wall, a second opening through said second end wall adapted to be generally coaxial with the shaft end portion, and means on said second end wall for engaging the dynamoelectric machine wall to arrest the conjoint coaxial movement of said cup and said head;

c. a chamber within said cup between said first and second end walls;

d. a seating member in said chamber including a generally annular flange spaced adjacent said first end wall, first and second extensions extending oppositely from said flange, said first extension being at least in part movable in said second opening in said second end wall and generally coaxial therewith, a seat on the free end of said first extension for seating engagement with the annular member, and a bore extending through said seat into said seating member and adapted to be generally coaxial with the shaft end portion to receive it upon the conjoint and relative coaxial movements of said head and said cup;

e. a bearing assembly mounted in said recess to said first end wall and coupled with said second extension of said seating member for affording generally universal movement thereto to maintain its seat engaged with the annular member in the event of misalignment thereof when it is moved into engagement with the shaft end portion;

f. a first O-ring engaged between said flange and said first end wall for resiliently resisting the universal movement of said seating member and restoring it to an aligned position in which said bore is generally coaxial with the shaft end portion thereby to compensate for the misalignment of the annular member in the event thereof;

g. a second O-ring disposed between said first and second sidewalls for resiliently resisting conjoint displacement of said cup with said seating member relative to said head and for restoring said cup with said seating member to its aligned position;

h. a pair of opposed abutments on said cup and one of said seating member and said head and spaced apart a predetermined distance defining the extent of the relative coaxial movement of said head and said cup;

i. means associated with at least one of said seating member and said cup for supporting the annular member generally coaxially with respect to the shaft end portion; and j. said head and said cup being conjointly coaxially movable in response to an applied force on said head to initially guide the annular member onto the shaft end portion into gripping engagement therewith and said head being thereafter further coaxially movable relative to said cup upon the engagement of said engaging means with the dynamoelectric machine wall through the predetermined travel until said abutments engage each other thereby to further advance the annular member along the shaft end portion to the selected position with at least a part of the annular member being disposed within the first opening in the selected spaced relation with the dynamoelectric machine wall about the first opening.

33. Apparatus for assembling a generally annular member in gripping engagement on a shaft comprising:
   a. means movable generally coaxially with respect to the shaft for guiding the member onto an end portion of the shaft and into the gripping engagement therewith, said guiding means including:
   b. means for seating engagement with the member,
   c. means for mounting said seating means generally in limited universal movement relation with said guiding means to accommodate misalignment of the member in the event thereof when it is engaged with the shaft; and
   d. means for resiliently resisting the universal movement of said seating means to compensate for member misalignment.

34. The apparatus as set forth in claim 33 wherein said resiliently resisting means comprises an O-ring engaged between said guiding means and said seating means.

35. The apparatus as set forth in claim 33 wherein said seating means includes a generally radially extending flange disposed between a pair of opposite extensions, one of said extensions being connected with said mounting means and the other of said extensions having a seat for engagement with the member, and said resiliently resisting means being engaged between said flange and said guiding means.

36. The apparatus as set forth in claim 33 wherein said mounting means comprises means disposed for pivotal bearing engagement in said guiding means and connected with said seating means.

37. The apparatus as set forth in claim 33 further comprising means for supporting engagement with at least a part of said seating means and movably mounted on said guiding means.

38. The apparatus as set forth in claim 37 further comprising other means engaged between said guiding means and said supporting means for resiliently resisting generally universal movement of said supporting means with said seating means in the event of the member misalignment.

39. The apparatus as set forth in claim 38 wherein said other resiliently resisting means is constituted by an O-ring.

40. The apparatus as set forth in claim 37 further comprising means associated with at least one of said supporting means and said seating means for releasably receiving the member in a selected position.

41. The apparatus as set forth in claim 33 wherein said seating means includes means for generally coaxially receiving at least a part of the end portion of the shaft upon the engagement of the member therewith.

42. A method of manufacturing a dynamoelectric machine comprising the steps of:
   a. assembling in the dynamoelectric machine a rotatable assembly with axial movement generally along its axis of rotation predeterminately limited;
   b. disposing the dynamoelectric machine between a pair of opposed means operable generally for mounting a pair of components carried thereby in gripping engagement about a pair of opposite end portions of the rotatable assembly; and
   c. subjecting the mounting means to forces for actuating them so as to guide the components into and along the opposite end portions in the gripping engagement therewith toward a pair of selected positions on the rotatable member without appreciably displacing it along its axis, said subjecting step including sensing an instantaneous location of each component as it is being guided along the rotatable assembly with respect to a part of the dynamoelectric machine and then advancing each component a predetermined distance from its sensed instantaneous location into the selected positions thereof.

43. A method of assembling a pair of components in gripping engagement generally about opposite end portions of a rotatable assembly of a prime mover comprising the steps of:
   a. disposing the end portions of the rotatable assembly and the components generally equidistantly and coaxially with respect to each other with the rotatable assembly having the capacity for displacement only to a limited degree generally along its axis of rotation in the prime mover; and
   b. moving the components in response to generally constant equal and opposite forces applied thereto onto the opposite end portions in the gripping engagement therewith and toward a pair of preselected mounted locations thereon without appreciable displacing the rotatable assembly along its axis, said moving step including sensing an instantaneous position of each component during its travel along the rotatable assembly and advancing the components a predetermined distance from their respective sensed instantaneous positions into the selected mounted locations thereof.

44. A method of operating apparatus for mounting a generally annular member in gripping engagement at a selected position on a rotatable shaft of a prime mover and generally in spaced relation with a wall of the prime mover about an opening therein through which the shaft extends comprising the steps of:
   a. actuating means for guiding the member onto the shaft and driving it therealong toward the opening and compensating the guiding and driving means in the event of misalignment of the member on the shaft so as to maintain the member generally in coaxial relation with respect to the shaft;
   b. engaging a part of the guiding and driving means in a locating position on the wall as the member is driven along the shaft; and
   c. moving at least another part of the guiding and driving means relative to the first named part thereof so as to further drive the member a predetermined distance along the shaft toward the selected mounted position in the gripping engagement therewith wherein at least a part of the member is disposed within the opening in the spaced relation with the wall.

45. Apparatus for mounting a pair of components in gripping engagement about a pair of opposite end portions of an assembly rotatable about its axis in a prime mover comprising:
   a. means for supporting the prime mover in a selected position; and
   b. a pair of opposed means movable relative to said supporting means and operable generally for guiding the components onto the opposite end portions of the assembly in the gripping engagement therewith and for driving the components therealong toward a pair of selected mounted positions without appreciably displacing the assembly along its axis in the prime mover, said guiding and driving means respectively including a pair of conjointly and relatively movable members, means on one of said members for engaging the prime mover to arrest the conjoint movement of said members, and the other of said members being thereafter movable relative to said one member to drive the component associated therewith to its selected mounted positions.

46. The apparatus as set forth in claim 45 wherein said guiding and driving means further respectively include a pair of opposed abutments on said members spaced apart a predetermined distance defining the extent of the relative movement therebetween, one of said abutments being movable with the other member through the predetermined distance into engagement with the other of said abutments on said one member to arrest the relative movement of said members when said engaging means is engaged with the prime mover.

47. Apparatus for assembling a pair of components generally coaxially and in gripping engagement about a pair of opposite end portions on an assembly rotatable about its axis in a prime mover, said apparatus comprising a pair of means for guiding and driving the components onto and along the opposite end portions in the gripping engagement therewith, and said guiding and driving means including means for compensating coaxial misalignment of the components in the event thereof when they are engaged with the opposite end portions, respectively, so as to at least generally limit movement of the rotatable assembly along its axis in the prime mover in response to said guiding and driving means acting on the components.

48. Apparatus as set forth in claim 47 wherein said compensating means include means for seating engagement with the components and mounted in at least limited universal movement relation in said guiding and driving means to accommodate the coaxial misalignment of the components in the event thereof, respectively.

49. Apparatus as set forth in claim 48 wherein said compensating means further include means for resiliently opposing the at least limited universal movement of said seating means, respectively.

* * * * *

UNITED STATES PATENT OFFICE
CERTIFICATE OF CORRECTION

PATENT NO. : 3,986,252
DATED : October 19, 1976
INVENTOR(S) : John M. Brunschwig It is certified that error appears in the above-identified patent and that said Letters Patent are hereby corrected as shown below:

Col.  2, line 37, delete in its entirety.
Col.  4, line 37, after "movers" insert --,--.
Col. 11, line 27, after "37a" insert --,--.
Col. 15, line 55, delete "letters" and insert --Letters--;
        line 56, delete "patent" and insert --Patent--.
Col. 19, line 40, delete "27" and insert --26--.

Signed and Sealed this

Eighth Day of March 1977

[SEAL]

Attest:

RUTH C. MASON
Attesting Officer

C. MARSHALL DANN
Commissioner of Patents and Trademarks